United States Patent [19]
DiRisio et al.

[11] Patent Number: 6,163,650
[45] Date of Patent: Dec. 19, 2000

[54] CAMERA WITH QUIETLY OPERATING MANUAL FILM WINDER AND ANTI-BACKUP DEVICE

[75] Inventors: Anthony DiRisio, Rochester; Joel S. Lawther, East Rochester; Roger A. Fields, Pittsford, all of N.Y.

[73] Assignee: Eastman Kodak Company, Rochester, N.Y.

[21] Appl. No.: 09/334,223

[22] Filed: Jun. 16, 1999

[51] Int. Cl.[7] .............................. G03B 17/02; G03B 1/00
[52] U.S. Cl. .............................. 396/6; 396/395; 396/411
[58] Field of Search .............................. 396/6, 387, 395, 396/396, 411, 413, 535

[56] References Cited

U.S. PATENT DOCUMENTS

| 3,603,232 | 9/1971 | Jones ........................................ 396/411 |
| 3,736,015 | 5/1973 | Dierks et al. ............................ 396/411 |
| 5,748,988 | 5/1998 | Alligood et al. ............................. 396/6 |
| 5,765,065 | 6/1998 | Yoshida et al. ........................... 396/396 |
| 5,933,665 | 8/1999 | Smart et al. .............................. 396/348 |
| 6,016,404 | 1/2000 | DiRisio ....................................... 396/6 |

*Primary Examiner*—Eddie C. Lee
*Attorney, Agent, or Firm*—Roger A. Fields

[57] ABSTRACT

A camera comprising a film winder manually rotatable in a film winding direction about an axis and having a continuous alternating series of teeth and spaces concentric about the axis, and an anti-backup device having a tooth that can be received in any one of the spaces to bottom out in the space in order to prevent reverse rotation of the film winder in a film unwinding direction, is characterized in that the film winder is constructed to be tilted from being perpendicular to the axis in order to only partially retract any one of the spaces that has received the tooth from the tooth, when one manually rotates the film winder in the film winding direction, whereby as long as the film winder is tilted the tooth cannot bottom out in any one of the spaces that has received the tooth. This results in a film winder and anti-backup device that are quietly operating.

11 Claims, 12 Drawing Sheets

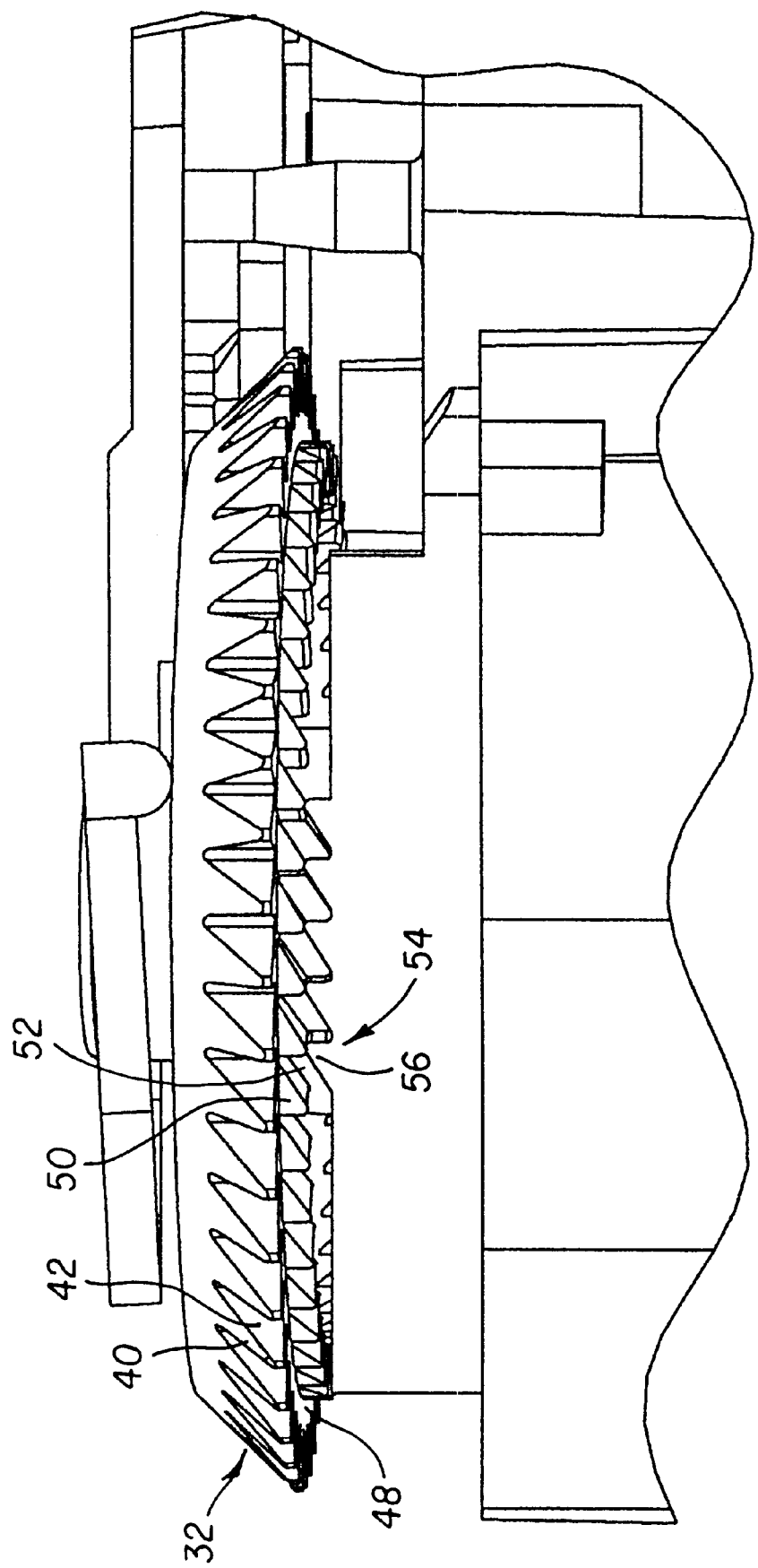

CAMERA WITH QUIETLY OPERATING MANUAL FILM WINDER AND ANTI-BACKUP DEVICE

FIELD OF THE INVENTION

The invention relates generally to the field of photography, and in particular to cameras with an anti-backup device that permits manual rotation of a film winder in a film winding direction and prevents reverse rotation of the film winder in a film unwinding direction. More specifically, the invention relates to a manual film winder and an anti-backup device that are quietly operating.

BACKGROUND OF THE INVENTION

Film and cameras that are all in one, commonly referred to as disposable, single-use or one-time-use cameras, have become well known. The one-time-use camera is a simple point-and-shoot type camera comprising an opaque plastic main body part that supports a conventional film cartridge in a cartridge receiving chamber, an unexposed film roll prewound from the film cartridge onto a film supply spool in a film supply chamber, a fixed-focus taking lens, a film metering mechanism with a rotatably supported metering sprocket that engages the filmstrip, a manually rotatable film winder or film winding thumbwheel rotatably engaged with a film take-up spool inside the film cartridge, a single-blade shutter, a manually depressible shutter release button, a rotatable frame counter for indicating the number of exposures remaining to be made on the filmstrip, a direct see-through viewfinder having front and rear viewfinder lenses, and in some models an electronic flash. A pair of opaque plastic front and rear cover parts house the main body part between them to complete the camera. The rear cover part connects to the main body part and/or to the front cover part to make the main body part light-tight. A decorative cardboard outer box or label at least partially covers the front and rear cover parts and has respective openings for the taking lens, etc.

After each picture is taken with the one-time-use camera, the photographer manually rotates the thumbwheel in a film winding direction to similarly rotate the film take-up spool inside the film cartridge. This winds an exposed frame of the filmstrip from a rear backframe (exposure) opening in the main body part into the film cartridge and advances an unexposed frame of the filmstrip from the unexposed film roll to the rear backframe opening. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent further manual rotation of the thumbwheel in the film winding direction. Manually depressing the shutter release button to take another picture pivots the metering lever out of engagement with the thumbwheel to permit renewed rotation of the thumbwheel in the film winding direction. When the maximum number of exposures available on the filmstrip have been made, and the filmstrip is completely wound into the film cartridge, the one-time-use camera is given to a photofinisher who separates the rear cover part from the main body part and removes the film cartridge with the exposed filmstrip from the cartridge receiving chamber. Then, he removes the exposed filmstrip from the film cartridge to develop the latent images and make prints for the customer.

PROBLEM IN THE PRIOR ART

As described in commonly assigned prior art U.S. Pat. No. 5,748,988 issued May 5, 1998, a one-time-use camera usually has an elongate rear opening in the rear cover part, from which the film winding thumbwheel radially protrudes to permit the thumbwheel to be manually rotated in the film winding direction. The thumbwheel has a continuous alternating series of peripheral symmetrical teeth and interdental spaces that are to be manually grasped or fingered to rotate the thumbwheel in the film winding direction. A resilient cantilever beam with one end fixed to, i.e. integral with, the rear cover part has an anti-backup pawl tooth at a free end of the beam. The pawl tooth is received in anyone of the interdental spaces to prevent reverse rotation of the thumbwheel, i.e. rotation in a film unwinding direction which is opposite to the film winding direction, and is forcibly pushed or cammed out of anyone of the interdental spaces to make the beam flex away from the thumbwheel when the thumbwheel is rotated in the film winding direction.

Whenever the pawl tooth is received in any one of the interdental spaces, it comes to rest bottomed out in the space. The bottoming out of the pawl tooth in successive ones of the interdental spaces as the film winder is rotated in the film winding direction produces a produces a periodic noise that can be considered to be objectionable. Thus, there is a continuous design effort to make the film winder and anti-backup device operate more quietly.

SUMMARY OF THE INVENTION

A camera comprising a film winder manually rotatable in a film winding direction about an axis and having a continuous alternating series of teeth and spaces concentric about the axis, and an anti-backup device having a tooth that can be received in any one of the spaces to bottom out in the space in order to prevent reverse rotation of the film winder in a film unwinding direction, is characterized in that:

the film winder is constructed to be tilted from being perpendicular to the axis in order to only partially retract any one of the spaces that has received the tooth from the tooth, when one manually rotates the film winder in the film winding direction, whereby as long as the film winder is tilted the tooth cannot bottom out in any one of the spaces that has received the tooth. This results in a film winder and anti-backup device that are quietly operating.

BRIEF DESCRIPTION OF THE DRAWINGS

FIG. 12 is a front elevation view similar to FIG. 11, showing the film winder being manually rotated in the film winding direction.

DETAILED DESCRIPTION OF THE INVENTION

Figure 1:
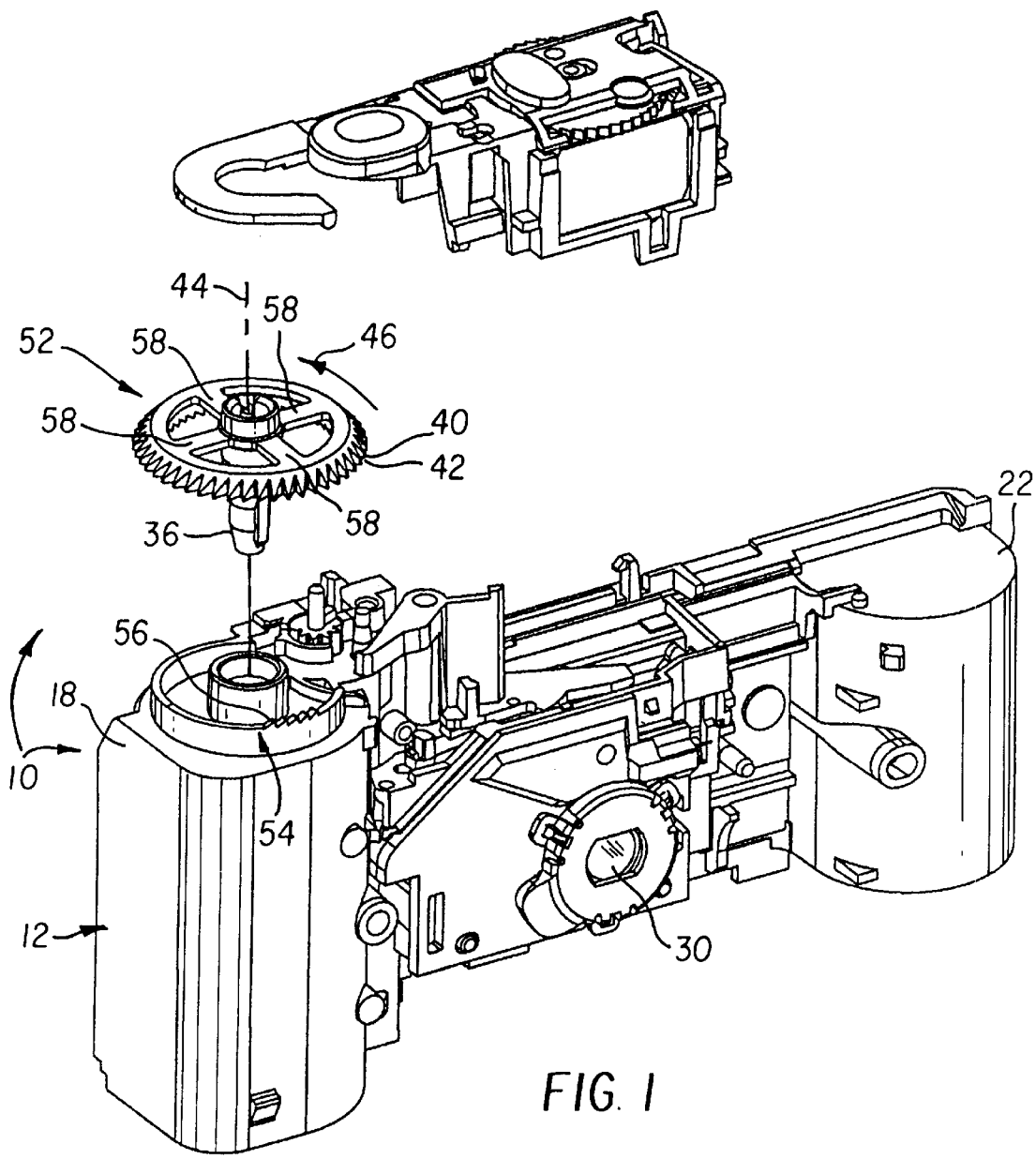
FIG. 1 is an exploded front top perspective view of a main body part of a one-time-use camera including a film winder and an anti-backup device, according to a preferred embodiment of the invention.

The invention is disclosed as being embodied preferably in a so-called one-time-use or disposable camera. Because the features of a one-time-use or disposable camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–12 show a one-time-use camera 10. The one-time-use camera 10 includes a plastic opaque main body part 12, a plastic opaque front cover part 14, and a plastic opaque rear cover part 16. See FIGS. 1 and 5–8. The front cover part 14 and the rear cover part 16 house the main body part 12 between them and are connected releasably to one another and to the main body part 12 via known hook-in-hole connections.

As is typical, the main body part 12 has a rearwardly open cartridge receiving chamber 18 for a conventional film cartridge 20 and a rearwardly open film supply chamber 22. See FIGS. 2 and 4. During manufacture, a filmstrip 24 is prewound from the film cartridge 20 into an unexposed film roll 26 which is placed in the film supply chamber 22. A rearwardly open backframe opening 28 is located between the cartridge receiving chamber 18 and the film supply chamber 22 for exposing successive frames of the filmstrip 24 when ambient light is received through a front taking lens 30 on the main body part 12.

A film winder or film winding thumbwheel 32, rotatably supported on the main body part 12, above the cartridge receiving chamber 18, radially protrudes partially from an elongate narrow opening 34 in the rear cover part 16 and has a depending coaxial stem 36 in coaxial engagement with an exposed top end 38 of a film take-up spool inside the film cartridge 20. The film winding thumbwheel 32 has a continuous alternating series of peripheral-edge symmetrical teeth 40 and interdental spaces 42 that are arranged in a circle concentric about an axis 44 of the thumbwheel. The teeth 40 and the spaces 42 readily permit the thumbwheel 32 to be manually grasped or fingered to rotate the thumbwheel in a film winding direction 46, i.e. counter-clockwise in FIGS. 1, 2, 4 and 5, about the axis 44, to similarly rotate the film take-up spool inside the film cartridge 20. This is done in order to wind an exposed frame of the filmstrip 24 from the backframe opening 28 into the film cartridge 20 and to move a fresh frame of the filmstrip from the unexposed film roll 26 to the backframe opening.

Figure 2:
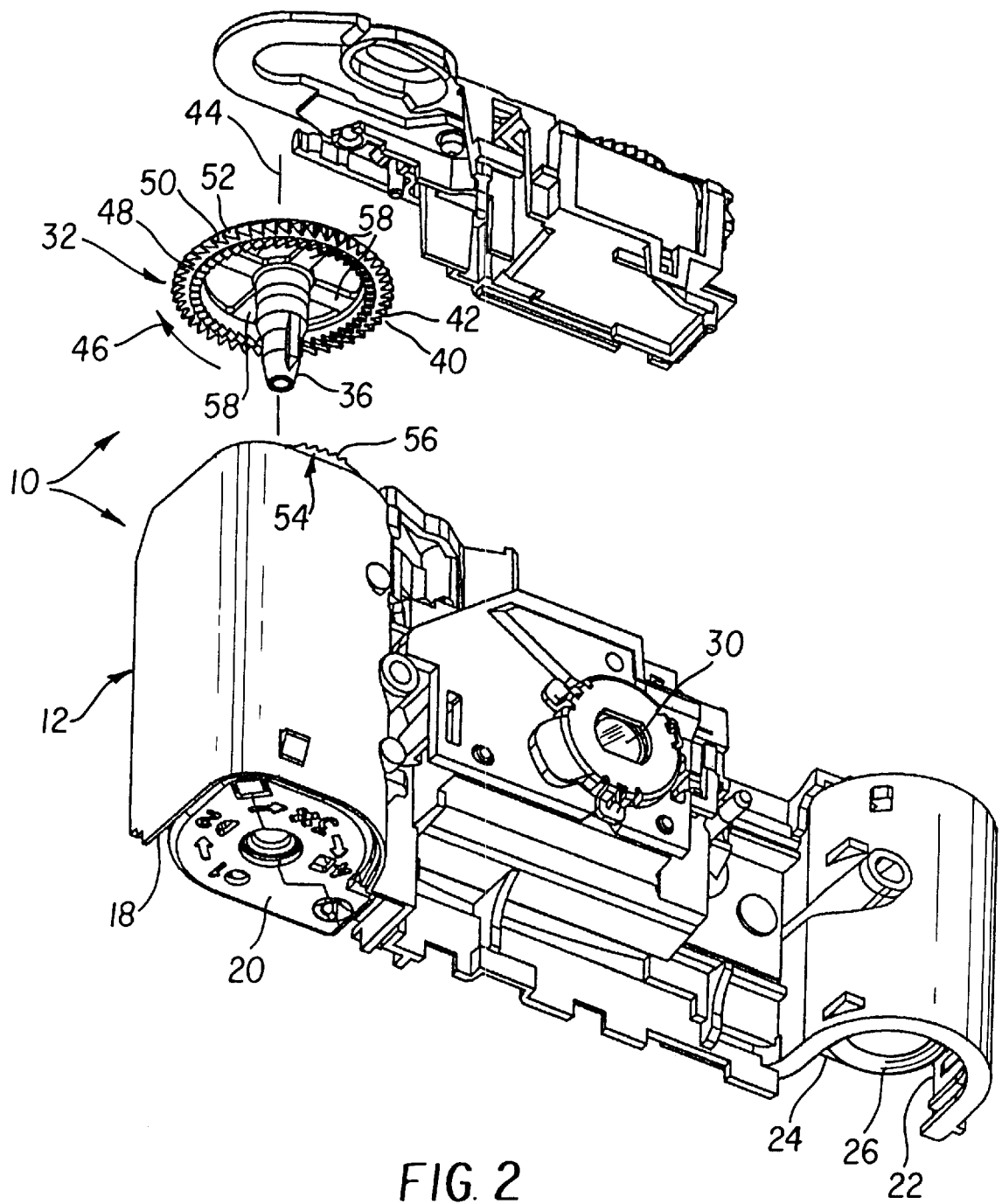
FIG. 2 is an exploded front bottom perspective view of the main body part including the film winder and the anti-backup device as shown in FIG. 1.
Figure 3:
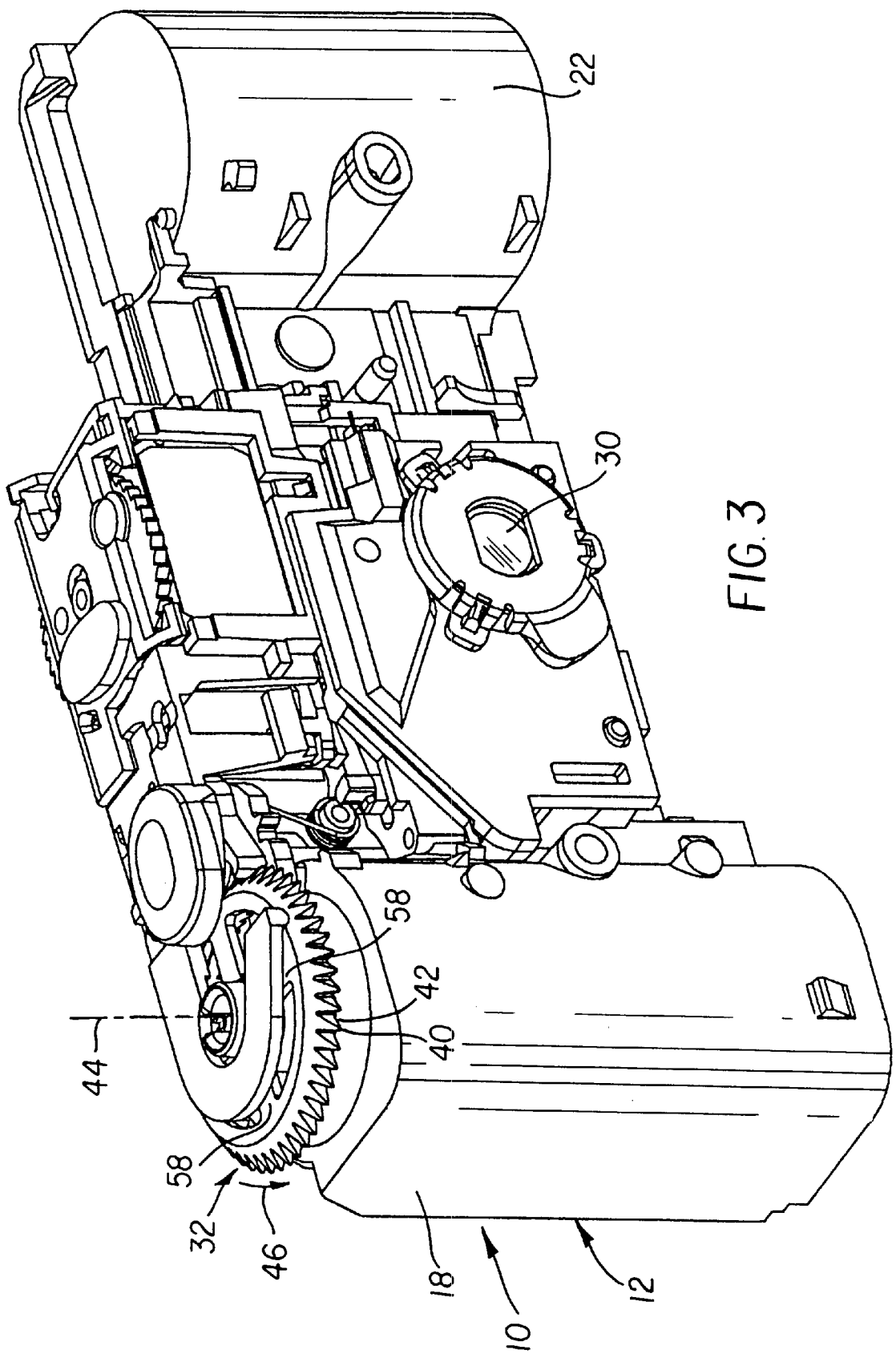
FIG. 3 is an assembled front perspective view of the main body part including the film winder and the anti-backup device.
Figure 4:
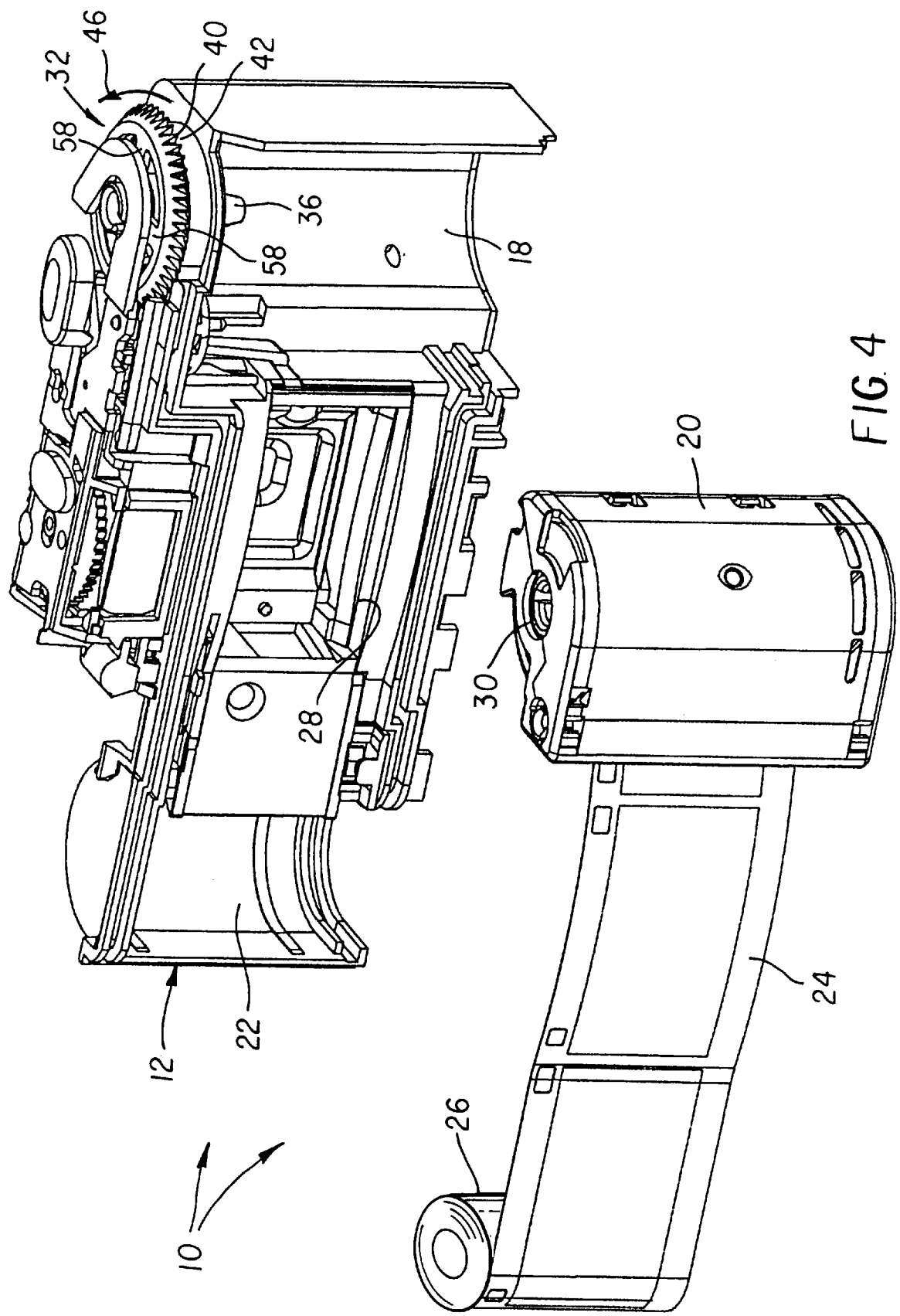
FIG. 4 is an assembled rear perspective view of the main body part including the film winder and the anti-backup device, further showing a film cartridge and a separate unexposed film roll.
Figure 5:
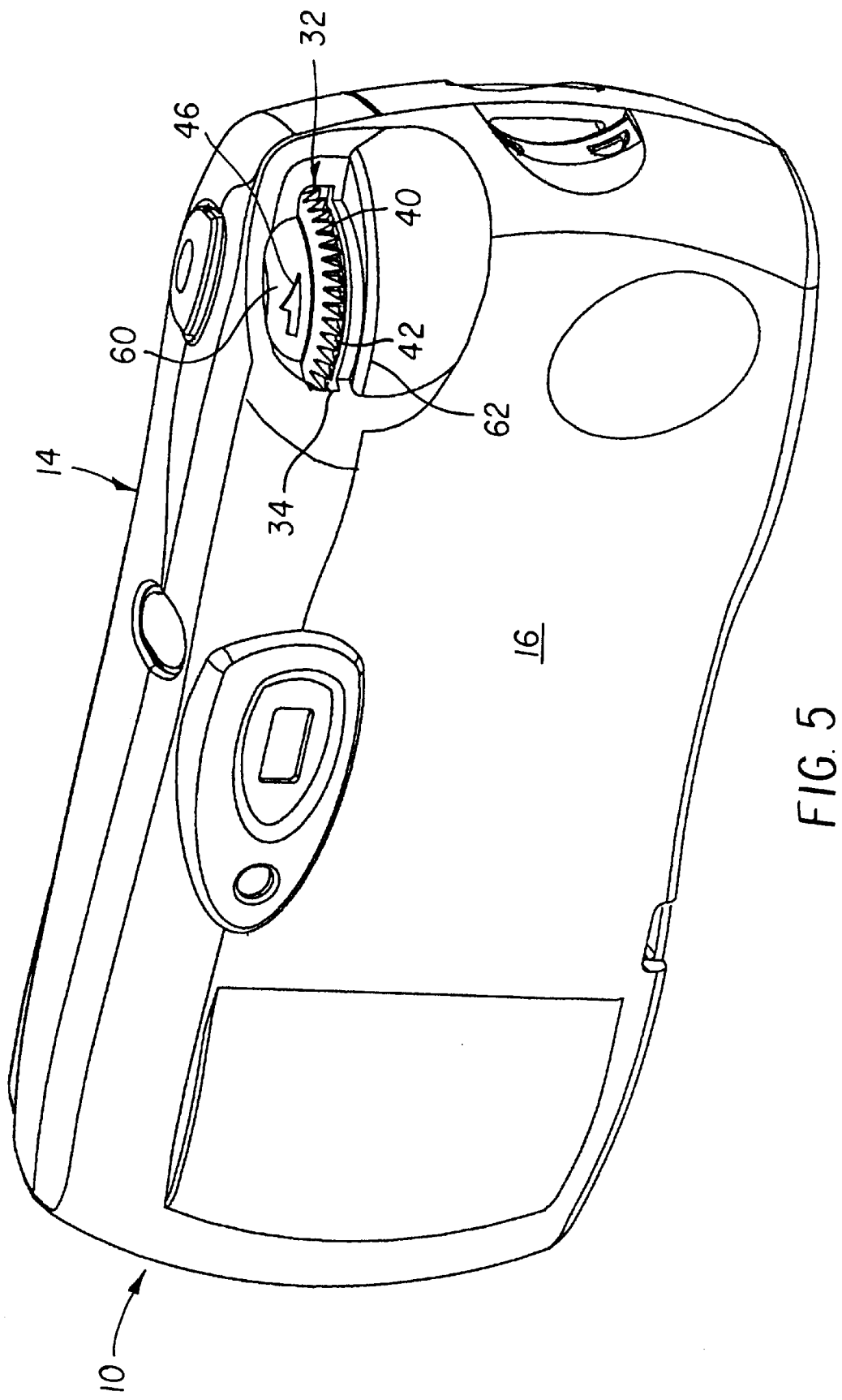
FIG. 5 is a rear perspective view of the one-time-use camera.
Figure 6:
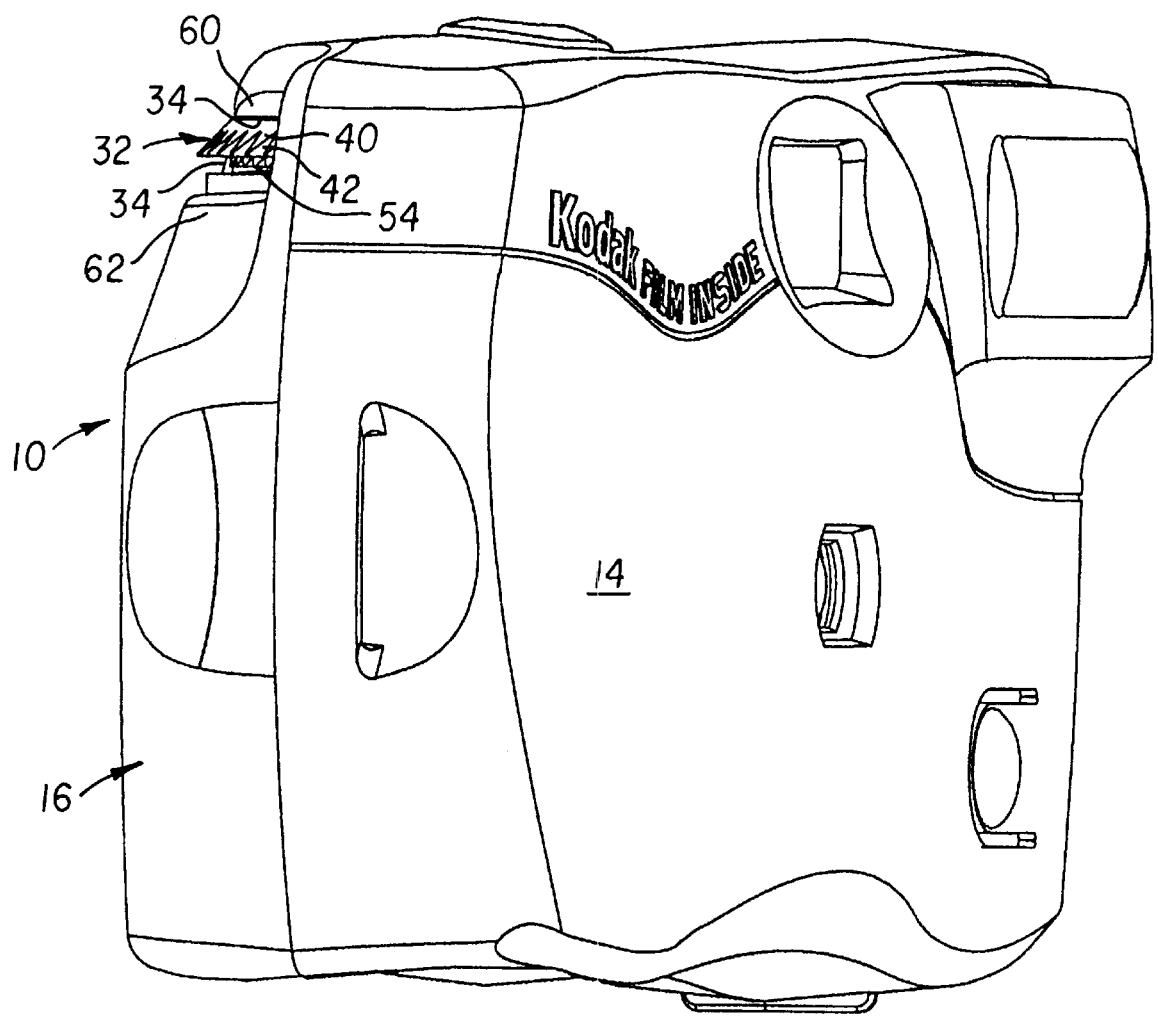
FIGS. 6 and 7 are end views of the one-time-use camera as seen from different angles.
Figure 7:
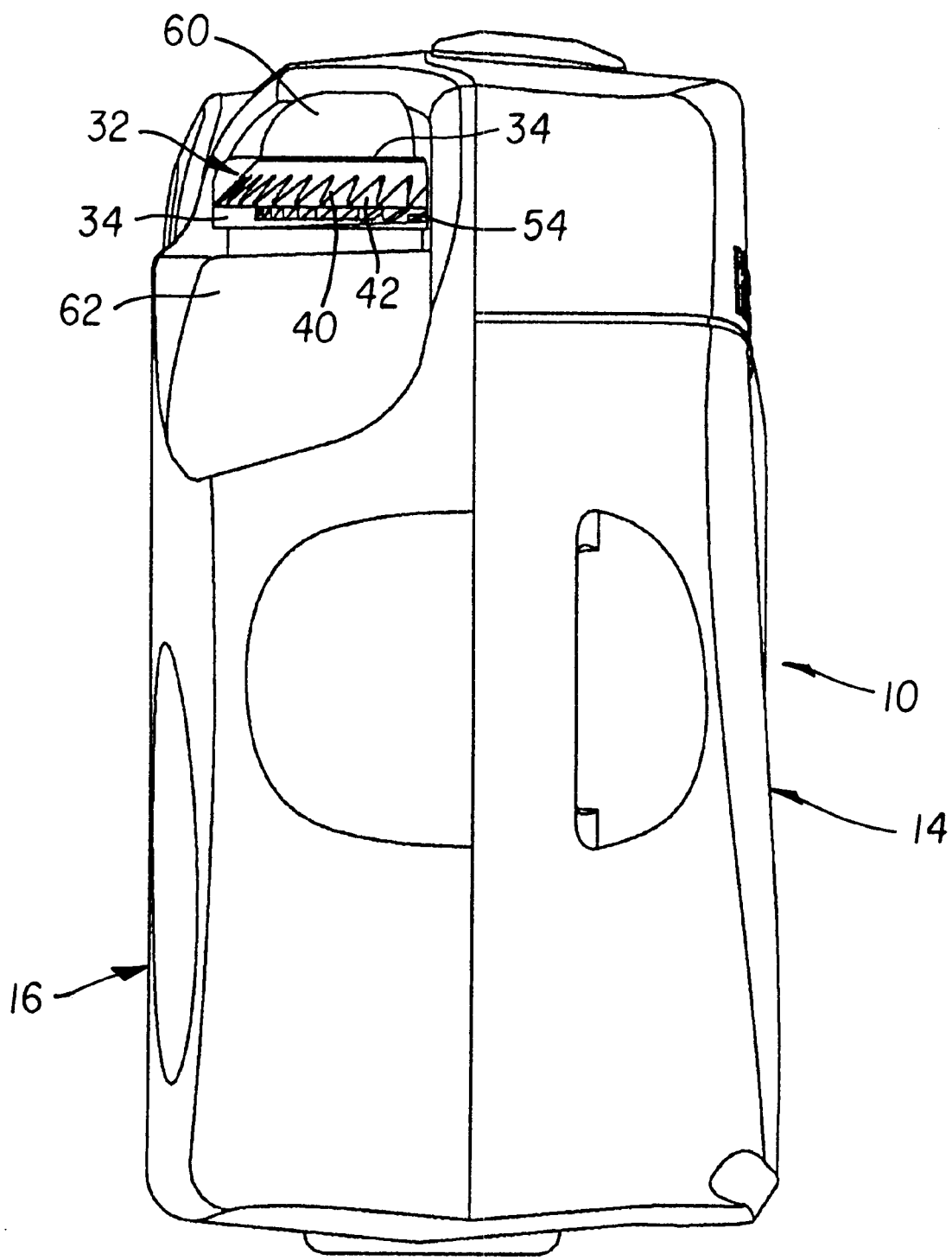
Figure 8:
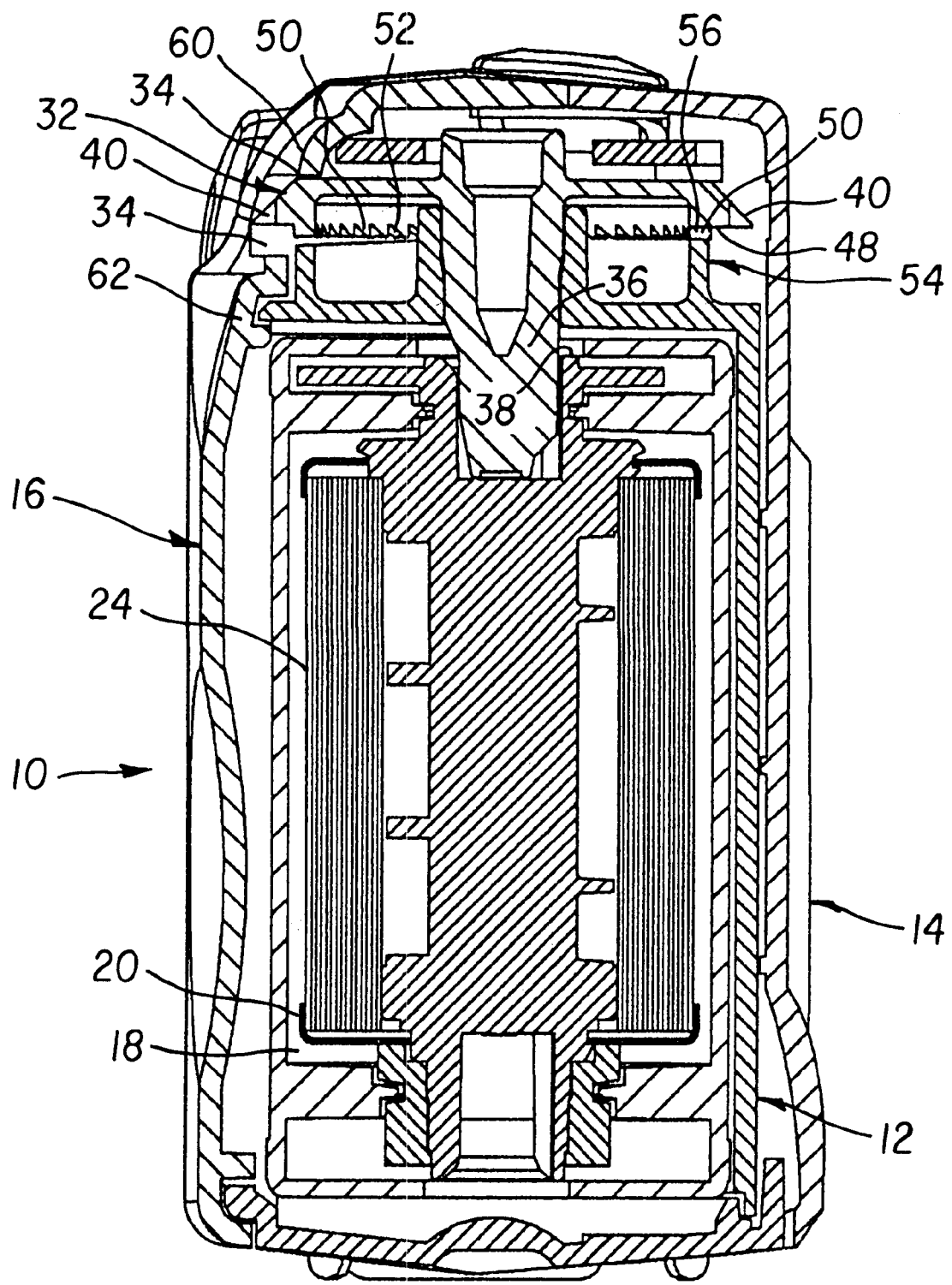
FIG. 8 is a side elevation view in section of the one-time-use camera, showing engagement of the film winder and the anti-backup device.
Figure 9:
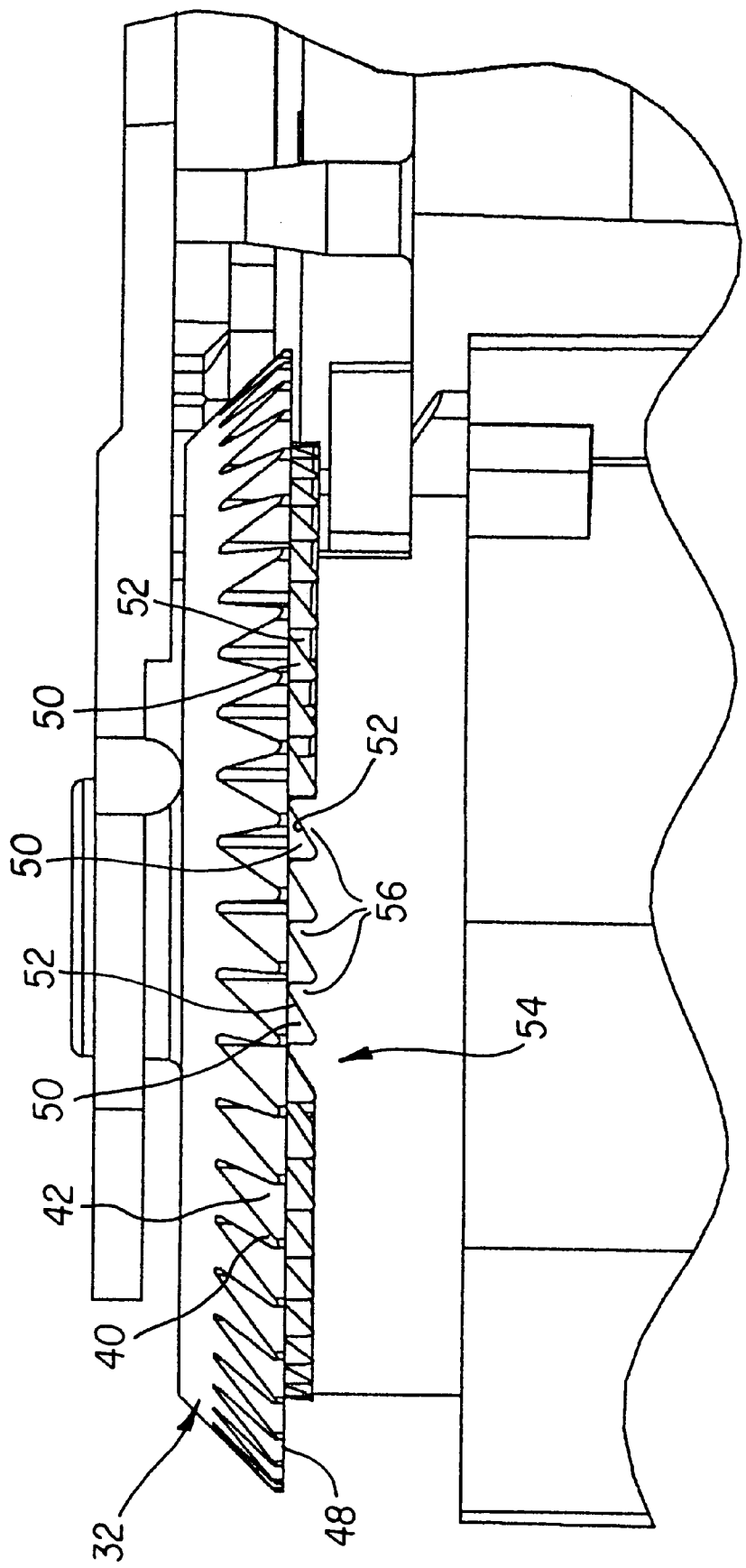
FIG. 9 is a front elevation view of the film winder and the anti-backup device as shown in FIG. 8.

As shown in FIGS. 2, 8 and 9, the film winding thumbwheel 32 has an underside 48 with a continuous alternating series of asymmetrical teeth 50 and interdental spaces 52 that are arranged in a circle parallel to the circle of peripheral-edge teeth 40 and spaces 42.

An anti-backup device 54 has a plurality of anti-backup teeth 56 arranged in an arc on the main body part 12, between the cartridge receiving chamber 18 and the series of asymmetrical teeth 50 and interdental spaces 52 on the underside 48 of the film winding thumbwheel 32. See FIGS. 1, 2, 8 and 9. The anti-backup teeth 56 are similar to the teeth 50. This permits the anti-backup teeth 56 to be received in any one of the spaces 52 to bottom out in the space in order to prevent reverse rotation of the thumbwheel 32 in a film unwinding direction which is opposite to the film winding direction 46. The anti-backup teeth 56 are positioned on the main body part 12 in a range of 150 degrees –210 degrees, i.e. 180 degrees +/–30 degrees, from the elongate opening 34 in the rear cover part 16.

The film winding thumbwheel 32 has a plurality of radial spokes 58 that are readily deformable to change shape through stress in order to permit the thumbwheel to be tilted (inclined) from being perpendicular to the axis 44 and are resilient to recover their shape after deformation in order to urge the thumbwheel to return to being perpendicular to the axis. See FIGS. 1, 2 and 9–10.

Method of Operation

The film winding thumbwheel 32 is manually grasped or fingered at its peripheral-edge teeth and spaces 40 and 42 to begin to rotate the thumbwheel in the film winding direction 46, i.e. counter-clockwise in FIGS. 1, 2, 4 and 5, about the axis 44, to similarly rotate the film take-up spool inside the film cartridge 20. This winds an exposed frame of the filmstrip 24 from the backframe opening 28 into the film cartridge 20 and moves a fresh frame of the filmstrip from the unexposed film roll 26 to the backframe opening.

Figure 10:
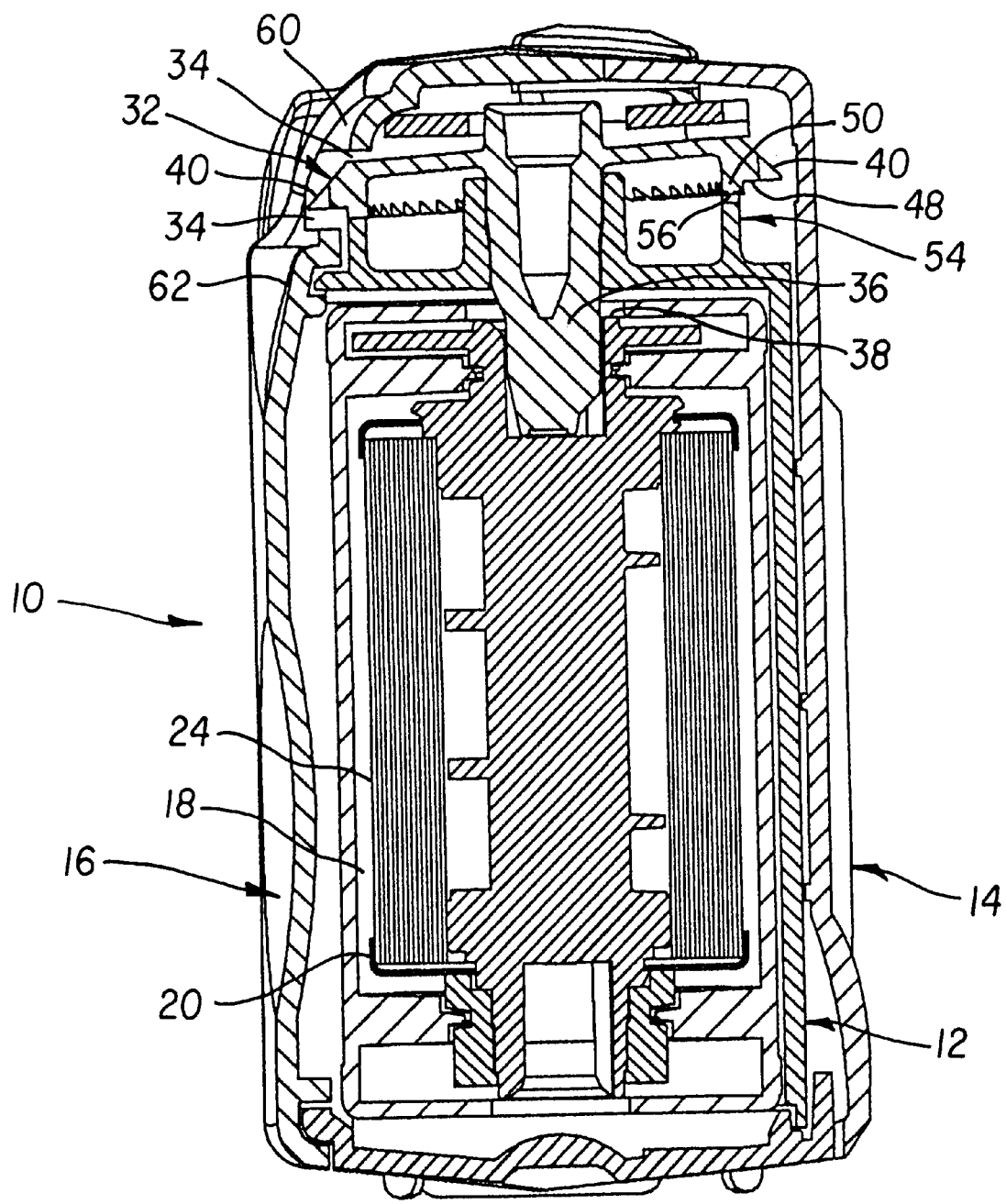
FIG. 10 is a side elevation view in section of the one-time-use camera, showing the film winder tilted from being perpendicular to its axis when the film winder is manually grasped or fingered to rotate the film winder in a film winding direction.
Figure 11:
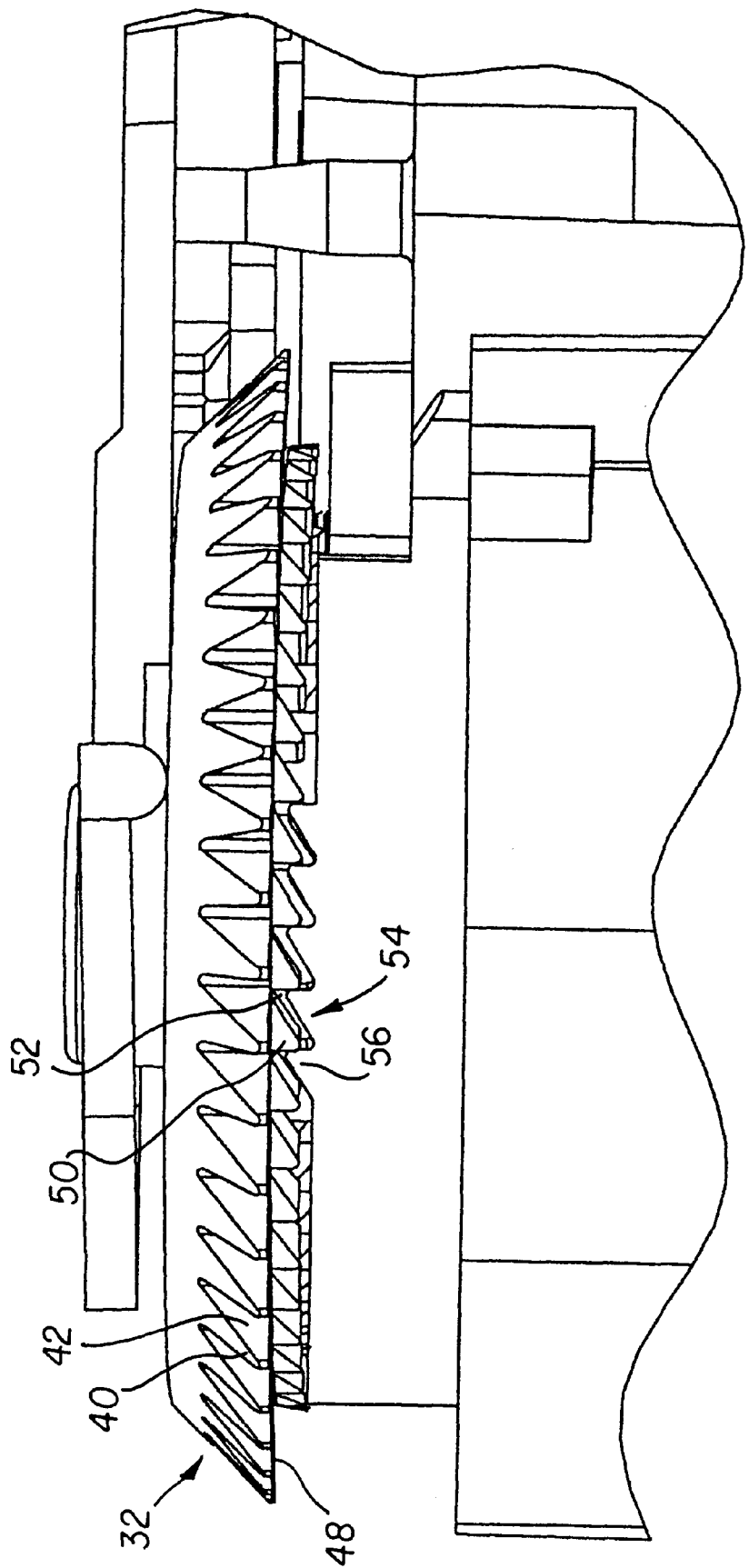
FIG. 11 is a front elevation view of the film winder and the anti-backup device as shown in FIG. 10.

The peripheral-edge teeth 40 are beveled or inclined in a way to cause the film winding thumbwheel 32 to be tilted (inclined) from being perpendicular to the axis 44, when one pushes against a portion (several) of the peripheral-edge teeth to manually rotate the thumbwheel in the film winding direction 46. As shown in FIGS. 10 and 11, this partially retracts any one of the spaces 52 on the underside 48 of the thumbwheel 32 that have received the anti-backup teeth 56 (about two-thirds) from those teeth. As long as the film winding thumbwheel 32 is tilted, the anti-backup teeth 56 cannot be bottomed out in any one of the spaces 52.

The rear cover part 16 has an upper exterior portion 60 above the elongate opening 34 in the rear cover part 16 and a lower exterior portion 62 below the elongate opening. The film winding thumbwheel 32 protrudes from the elongate opening 34 to project farther than the upper exterior portion 60 and less than the lower exterior portion 62. This tends to direct one's finger downward against the peripheral-edge teeth 40 to facilitate causing the film winding thumbwheel 32 to be tilted from being perpendicular to the axis 44, when one pushes against the peripheral-edge teeth to manually rotate the thumbwheel in the film winding direction 46.

The elongate opening 34 in the rear cover part 16 limits the extent to which the film winding thumbwheel 32 can be tilted.

With the film winding thumbwheel 32 tilted from being perpendicular to the axis 44 as shown in FIG. 11, rotation of the thumbwheel in the film winding direction 46 causes the anti-backup teeth 56 to force the teeth 50 on the underside 48 of the thumbwheel to hop over the anti-backup teeth as shown in FIG. 12. The tilt of the thumbwheel 32 prevents the anti-backup teeth 56 from bottoming out in any one of the spaces 52 between the teeth 50.

The radial spokes 58 of the film winding thumbwheel 32 urge the thumbwheel to return to being perpendicular to the axis 44, when one releases the thumbwheel after manually rotating the thumbwheel in the film winding direction 46, to cause anyone of the spaces 52 that has received one of the anti-backup teeth 56 to move closer to the tooth for the tooth to bottom out in the space. This is shown in FIGS. 8 and 9.

The invention has been described with reference to a preferred embodiment. However, it will be appreciated that variations and modifications can be effected by a person of ordinary skill in the art without departing from the scope of the invention. For example, instead of the radial spokes 58 being deformable to permit the film winding thumbwheel 32 to be tilted from being perpendicular to the axis 44, the coaxial stem 36 of the thumbwheel can be deformable for such purpose. See FIG. 1.

Parts List 10. one-time-use camera
12. main body part
14. front cover part
16. rear cover part
18. cartridge receiving chamber
20. film cartridge
22. film supply chamber
24. filmstrip
26. unexposed film roll
28. backframe opening
30. taking lens
32. film winder or film winding thumbwheel
34. elongate opening
36. coaxial stem
38. exposed top end
40. teeth
42. spaces
44. axis
46. film winding direction
48. underside
50. teeth
52. spaces
54. anti-backup device
56. anti-backup teeth
58. radial spokes
60. upper exterior portion
62. lower exterior portion

What is claimed is:

1. A camera comprising a thumbwheel that is manually rotatable in a film winding direction about an axis and that has a continuous alternating series of teeth and spaces concentric about said axis, and an anti-backup device having a tooth that can be received in any one of said spaces to bottom out in the space in order to prevent reverse rotation of said thumbwheel in a film unwinding direction, is characterized in that:

said thumbwheel has a plurality of radial spokes that are deformable to change shape through stress in order to permit said thumbwheel to be tilted from being perpendicular to said axis to be inclined to the axis in order to only partially retract any one of said spaces that has received said tooth from the tooth, when one manually rotates said thumbwheel in the film winding direction, whereby as long as said thumbwheel is tilted said tooth cannot bottom out in any one of said spaces that has received the tooth.

2. A camera as recited in claim 1, wherein said radial spokes are resilient to recover their shape after deformation in order to urge the thumbwheel to return to being perpendicular to said axis.

3. A camera as recited in claim 1, wherein said thumbwheel has an underside and said series of teeth and spaces are arranged in a circle along said underside, and a main body part having a cartridge receiving chamber rotationally supports said thumbwheel above said cartridge receiving chamber and includes said tooth between the cartridge receiving chamber and the thumbwheel.

4. A camera as recited in claim 3, wherein a cover part fits over said main body part and has an elongate opening, and said thumbwheel radially protrudes partially from said elongate opening to permit one to manually rotate the thumbwheel in the film winding direction and for said elongate opening to limit the extent to which the thumbwheel can be tilted with respect to said axis.

5. A camera as recited in claim 4, wherein said tooth is positioned on said main body part 180 degrees +/−30 degrees from said elongate opening.

6. A camera as recited in claim 4, wherein said cover part has an upper exterior portion above said elongate opening and a lower exterior portion below the elongate opening, and said thumbwheel protrudes from said elongate opening to project farther than said upper exterior portion and less than said lower exterior portion.

7. A camera as recited in claim 1, wherein said thumbwheel has a peripheral edge that is beveled in a way to cause said thumbwheel to be tilted from being perpendicular to said axis when one pushes against a portion of said peripheral edge to manually rotate said thumbwheel in the film winding direction.

8. A method of operating a camera which includes a thumbwheel that is manually rotatable in a film winding direction about an axis and has a continuous alternating series of teeth and spaces concentric about the axis, and an anti-backup tooth that can be received in any one of the spaces to bottom out in the space in order to prevent reverse rotation of the thumbwheel in a film unwinding direction, said method comprising the steps:

rotating the thumbwheel in the film winding direction; and tilting the thumbwheel from being perpendicular to the axis to be inclined to the axis, by deforming radial spokes of the thumbwheel to change shape through stress, in order to only partially retract any one of the spaces that has received the anti-backup tooth from the anti-backup tooth, when the thumbwheel is rotated in the film winding direction, whereby as long as the thumbwheel is tilted the anti-backup tooth cannot bottom out in any one of the spaces that has received the anti-backup tooth.

9. A camera comprising a thumbwheel that is manually rotatable in a film winding direction about an axis and that has a continuous alternating series of teeth and spaces concentric about said axis, and an anti-backup device having a tooth that can be received in any one of said spaces to bottom out in the space in order to prevent reverse rotation of said thumbwheel in a film unwinding direction, is characterized in that:

said thumbwheel is constructed to be sufficiently tilted from being perpendicular to said axis to be sufficiently inclined to the axis, without being moved perpendicular to the axis, to retract any one of said spaces that has received said tooth relative to the tooth, when one manually rotates said thumbwheel in the film winding direction, so that as long as said thumbwheel is tilted said tooth cannot bottom out in any one of said spaces.

10. A camera comprising a thumbwheel that is manually rotatable in a film winding direction about an axis and that has a continuous alternating series of teeth and spaces concentric about said axis, and an anti-backup device having a tooth that can be received in any one of said spaces to bottom out in the space in order to prevent reverse rotation of said thumbwheel in a film unwinding direction, is characterized in that:

said thumbwheel has a portion that is deformable to change shape through stress in order to permit said thumbwheel to be tilted from being perpendicular to said axis to be inclined to the axis in order to retract any one of said spaces that has received said tooth relative to the tooth, when one manually rotates said thumbwheel in the film winding direction, whereby as long as said thumbwheel is tilted said tooth cannot bottom out in any one of said spaces.

11. A method of operating a camera which includes a thumbwheel that is manually rotatable in a film winding direction about an axis and has a continuous alternating series of teeth and spaces concentric about the axis, and an anti-backup tooth that can be received in any one of the spaces to bottom out in the space in order to prevent reverse rotation of the thumbwheel in a film unwinding direction, said method comprising the steps:

rotating the thumbwheel in the film winding direction; and tilting the thumbwheel from being perpendicular to the axis to be inclined to the axis, by deforming the thumbwheel to change shape through stress, in order to retract any one of the spaces that has received the anti-backup tooth relative to the anti-backup tooth, when the thumbwheel is rotated in the film winding direction, whereby as long as the thumbwheel is tilted the anti-backup tooth cannot bottom out in any one of the spaces.

* * * * *